United States Patent Office 3,114,956
Patented Dec. 24, 1963

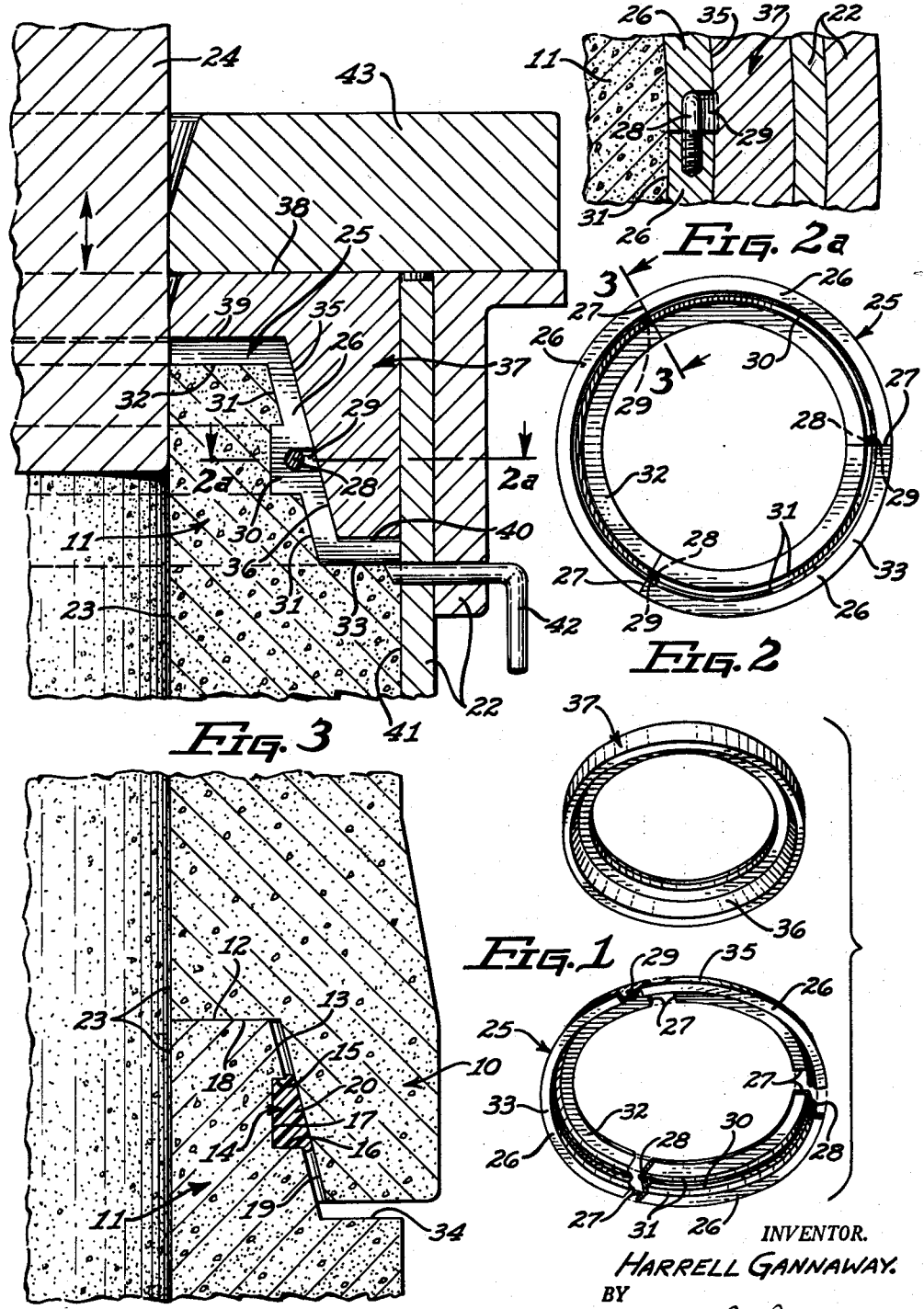

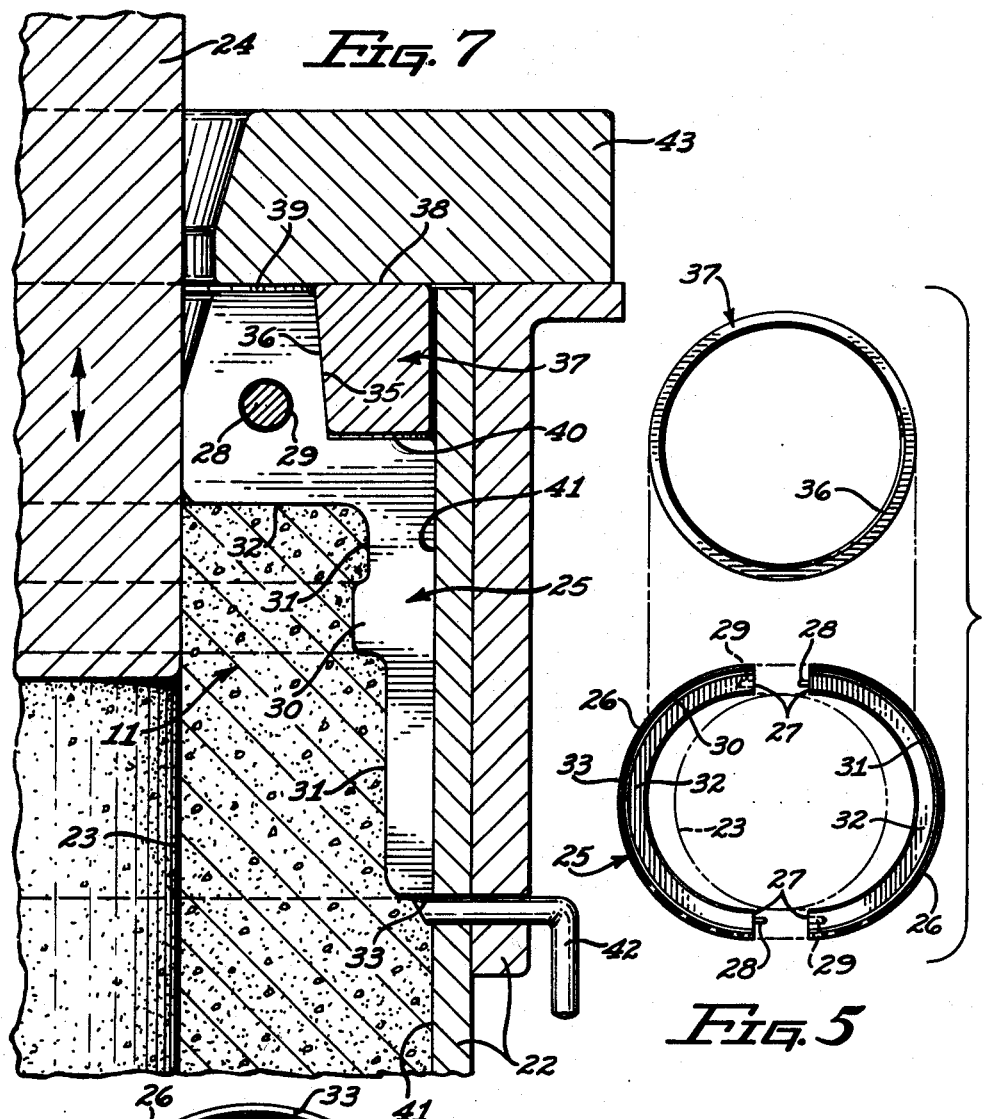

3,114,956
CONCRETE PIPE GASKET GROOVE FORMING
APPARATUS
Harrell Gannaway, Phoenix, Ariz., assignor to O'Malley-Gannaway Building Materials, Phoenix, Ariz., a corporation of Arizona
Filed Mar. 15, 1962, Ser. No. 180,417
1 Claim. (Cl. 25—39)

This invention pertains to apparatus for forming concrete pipe in a pipe making machine and is particularly directed to a device to form the gasket groove in the male end of such pipe.

One of the objects is to provide a simple and dependable device for accurately forming the gasket groove in a concrete pipe as it is formed in a concrete pipe making machine.

Another object is to provide a gasket groove forming device for use in forming concrete pipe which is quick and easy to apply in the pipe mold and to remove after the pipe has set up ready for curing.

A further object of this invention is to provide a device used in conjunction with a concrete pipe making machine which continuously under high production forms the male end and gasket groove to precise dimension and concentricity.

And it is a further object of this invention to provide a gasket groove forming device for concrete pipe which is easily removed from the raw cast pipe without damaging or marring of the completed pipe.

Further features and advantages of this invention will appear from a detailed description of the drawings in which:

FIG. 1 is an exploded perspective view showing the essential elements of the apparatus incorporating the features of this invention.

FIG. 2 is a bottom view of the structure of FIG. 1, shown in assembled conditions.

FIG. 2a is an enlarged fragmentary section on line 2a—2a of FIG. 3.

FIG. 3 is an enlarged fragmentary section on the line 3—3 of FIG. 2.

FIG. 4 is an enlarged fragmentary view showing the function of the gasket groove in the bell joint of a concrete pipe line.

FIG. 5 is an exploded view of an arrangement of essential elements of apparatus incorporating the features of this invention similar to that of FIGS. 1 to 4.

FIG. 6 is a bottom view of the structure of FIG. 5 shown in assembled condition.

FIG. 7 is an enlarged fragmentary section on the line 7—7 of FIG. 6.

In the manufacture of concrete pipe, FIG. 3 and FIG. 4, it is highly important to form the bell end 10 and male end 11 of the pipe accurately to facilitate the installation and joining of the pipe sections and to provide a dependable leak-proof seal at the joint. It is particularly important to maintain the abutment surface 12, the tapered surface 13 and the gasket groove 14 comprising the sides 15 and 16 and the bottom 17 under precise dimension and concentricity so as to properly mate with the abutment surface 18 and tapered bore 19 of the bell end 10 of the pipe so that the gasket 20 forms a proper seal at the pipe joint.

Ordinarily the concrete pipe sections are cast in a vertical position with the bell end 10 down, the outer surface 21 of the pipe being formed by the outer mould 22 which rests on a suitable platform while the aggregate is dumped in at the top and the mould structure subjected to suitable vibration to compact the material. The bore 23 of the pipe is formed and troweled smooth by the core element 24 which rises up through the mould as the material is fed in above and around core element 24 which finally emerges from out of the upper end of the pipe.

The male end 11 of the pipe is formed by a specially constructed molding ring 25 comprising a plurality of molding ring segments 26 having radially disposed abutment ends 27 which are axially aligned when in contact by the dowel pins 28 and the mating dowel pin holes 29 when the segments 26 are placed together. Each of the segments have the annular ring portion 30 formed on the tapered bore surface 31 thereof for forming the gasket groove 14 in the pipe. The radially disposed surface 32 of the ring 25 forms the abutment surface 12 on the upper end of the pipe while the radially disposed surface 33 forms the clearance surface 34 on the pipe. The exterior of the ring 25 is formed with an outwardly downwardly sloping surface 35 which matingly engages the tapered bore 36 in the header ring 37 so that downward pressure on the top surface 38 of the header ring firmly and accurately locks the ring segments 26 in position abutment contact at radially disposed abutment end parting lines 27 to form a continuous rigid ring engaging the male end 11 of the pipe. Suitable clearance is provided at 39 and 40 between the ring 25 and the header 37 for proper seating and aligning action between the tapered surfaces 35 and 36. The functioning and operation of the structures of FIGS. 1–3 and 5–7 are identical, except that in the latter group two segments 26 are used instead of three segments.

The assembled device 25—37 placed in the bore 41 of the outer mould 22 at the upper end thereof and initially supported on any suitable releasable means such as the pull pins 42 carried in the outer mould 22. The top surface 38 of the header ring 37 is backed up by the thrust platen 43 of the pipe making machine so that the upward thrust caused by the upward movement of the core element in forcing the concrete outwardly and upwardly against the ring segments 26 is absorbed through the header ring 37 to thereby automatically maintain the segments 26 in tight aligned abutting contact at 27 through the operation of the tapered surfaces 35—36 as described so that the greater the outward and upward forces against the segments 26 the tighter will be the tapered locking action thereon by the header ring.

After the pipe has been cast, with the core element 24 fully upwardly withdrawn and the thrust platen 43 withdrawn, the cast pipe in outer mould 22 is moved from the machine to the curing area. The outer mould 22 is then pulled upwardly from the cast pipe leaving the gasket groove forming device 25—37 on top of the cast pipe. The operator rotates this assembly a partial turn before final removal to break the suction seal and trowel the pipe end for fine finish. A screw driver or pinch bar is then placed in the clearance groove 40 to release the header ring from the segments 26 whereupon the segments are moved radially away from the pipe leaving the complete perfectly formed male end of the pipe to set up and age.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claim are intended to be included herein.

Having thus fully set forth and described this invention what is claimed and desired to be obtained by United States Letters Patent is:

A pipe male end and gasket groove molding apparatus for the vertical molding of core-formed cement pipe comprising in combination:

(a) a vertically disposed outer cylindrical mold, (b) a vertically disposed and vertically reciprocable cylindrical core disposed within said mold and equally spaced therefrom to form an annular space between the mold and the core, (c) a molding ring disposed within said outer cylindrical mold and adjacent the top thereof having, (d) a peripheral surface contacting the bore of said outer cylindrical mold and, (e) a bore surface slidingly contacting the peripheral surface of said cylindrical core so that the annular space between the peripheral surface of said core and the bore surface of said outer cylindrical mold is closed at the top by said molding ring while allowing vertical reciprocation of said core in the bore surface of said molding ring, (f) and a plurality of circumferentially disposed molding ring segments which are in radial and axial alignment to form a smooth continuous surfaced molding element, (g) radially disposed abutment end surfaces on each of said segments, (h) an annular surface formed within said molding ring facing said core and spaced therefrom to form the male end of the pipe, (i) an annular ring portion for forming the gasket groove in the male pipe end formed integral with said annular surface and projecting radially inwardly toward said core, (j) an outwardly and downwardly sloping surface on the exterior periphery of said ring facing the inner surface of said cylindrical mold and spaced radially inwardly therefrom, (k) a continuous one-piece header ring having a mating downwardly and outwardly sloping tapered bore surface of the same angular inclination as that of said outwardly and downwardly sloping surface on the exterior periphery of said molding ring segments so that the engagement of said sloping surfaces causes said header ring to hold said molding ring segments of the molding ring in closed abutment end contact aligned position as said core and cement charge is raised upwardly through said molding ring, (l) retractable stop means in said cylindrical mold adapted to support said molding ring segments against downward movement in the bore of said cylindrical mold, (m) and a thrust platen at the top of said mold and surrounding said core adapted to engage the top of said header ring to hold said header ring and said molding segments in positive closed abutment end contact against the force of the drag of said core on the molded cement pipe as said core is withdrawn upwardly out of said molded pipe, the molding ring and said thrust platen.

References Cited in the file of this patent

UNITED STATES PATENTS

| | | |
|---|---|---|
| 680,273 | Parker | Aug. 13, 1901 |
| 881,183 | Guyer | Mar. 10, 1908 |
| 1,786,385 | Andrews | Dec. 23, 1930 |
| 2,823,439 | Schmidgall | Feb. 18, 1958 |
| 2,863,205 | Seaman et al. | Dec. 9, 1958 |